(12) United States Patent
Fritsche et al.

(10) Patent No.: US 8,062,862 B2
(45) Date of Patent: Nov. 22, 2011

(54) HYDROLYSED EGG PROTEINS

(75) Inventors: Rodolphe Fritsche, La Tour-de-Peilz (CH); Raphael Schaller, Epalinges (CH); Isabelle Cartou, Singen (DE)

(73) Assignee: Nestec S.A., Vevey (CH)

( * ) Notice: Subject to any disclaimer, the term of this patent is extended or adjusted under 35 U.S.C. 154(b) by 282 days.

(21) Appl. No.: 12/304,938

(22) PCT Filed: Jun. 14, 2007

(86) PCT No.: PCT/EP2007/055884
§ 371 (c)(1),
(2), (4) Date: Dec. 15, 2008

(87) PCT Pub. No.: WO2007/144398
PCT Pub. Date: Dec. 21, 2007

(65) Prior Publication Data
US 2009/0304892 A1      Dec. 10, 2009

(30) Foreign Application Priority Data
Jun. 15, 2006    (EP) .................................. 06115545

(51) Int. Cl.
*C12P 21/06* (2006.01)
(52) U.S. Cl. ....................................... 435/68.1
(58) Field of Classification Search .................. None
See application file for complete search history.

(56) References Cited

U.S. PATENT DOCUMENTS

| | | |
|---|---|---|
| 3,914,448 A | 10/1975 | Takeuchi et al. |
| 5,039,532 A | 8/1991 | Jost et al. |
| 6,589,576 B2 | 7/2003 | Borschel et al. |
| 2002/0037357 A1* | 3/2002 | Fritsche et al. ............... 426/656 |

FOREIGN PATENT DOCUMENTS

| | | | |
|---|---|---|---|
| DE | 281540 | | 8/1990 |
| GB | 2249101 | | 4/1992 |
| JP | 61132157 | | 6/1986 |
| JP | 3280835 | | 12/1991 |
| KR | 2004-0048650 | * | 6/2004 |
| NL | 6501962 | | 8/1965 |
| WO | WO 0042863 | | 7/2000 |
| WO | WO 2006009448 | | 1/2006 |

OTHER PUBLICATIONS

Fiocchi et al. Annals of Allergy, Asthma, and Immunology (Official publication of American College of Allergy), Nov. 2004, 93 (5 suppl. 3) S38-46.*
International Search Report for International Application No. PCT/EP2007/055884 mailed on Sep. 13, 2007.
Written Opinion for International Application No. PCT/EP2007/055884 mailed on Sep. 13, 2007.
"Induction of systemic immunologic tolerance to beta-lactoglobulin by oral administration of a whey protein hydrolysate," by R. Fritsche et al., J. Allergy Clin. Immunol., vol. 100, No. 2, pp. 266-273.

* cited by examiner

*Primary Examiner* — Nashaat Nashed
(74) *Attorney, Agent, or Firm* — K&L Gates LLP

(57) ABSTRACT

This invention relates to a process for the production of enzymatically hydrolysed egg proteins comprising a first hydrolysis step in which intact egg proteins are subjected to enzymatic hydrolysis by a first protease, an intermediate heating step in which the product of the first hydrolysis is heated to a temperature not exceeding 75° C., a second hydrolysis step in which the product of the intermediate heating step is subjected to enzymatic hydrolysis by a second protease and an inactivation step in which the product of the second hydrolysis is heated to a temperature between 85 and 90° C. and maintained at this temperature for at least 30 minutes. The invention extends to an egg pasta product containing hydrolysed whole egg.

2 Claims, 2 Drawing Sheets

HYDROLYSED EGG PROTEINS

FIELD OF THE INVENTION

This invention relates to a process for reducing the allergenicity of egg proteins.

BACKGROUND TO THE INVENTION

Food allergies, of which the most common is cows' milk allergy, are caused, in most cases, by a reaction to the proteins in the food. In the early years of life the immune system is still developing and may fail to recognise and tolerate such dietary proteins. The result is that the baby or child or young animal treats the dietary protein as a foreign substance and develops an allergic response to it. Food allergies may affect not only humans but also other mammals such as dogs and cats.

Usually, food hypersensitivity appears just after a susceptible baby, child or young animal first encounters a new food. The first dietary proteins generally encountered by human babies at least are cows' milk proteins and, as noted above, cows' milk allergy is the most common food allergy. It is generally accepted that babies with established cows' milk allergy have an increased risk of developing allergies to other dietary proteins such as egg and cereal proteins but even those babies who have successfully developed oral tolerance to cows' milk proteins may subsequently develop allergies to other dietary proteins such as egg and cereal proteins when these are introduced into the diet at weaning.

From a dietary point of view there are two ways to treat an established allergy—either foods containing the allergen must be avoided altogether, or the foods must be treated to eliminate their allergenic potential, for example by extensive hydrolysis. Infant formulas containing extensively hydrolysed cows' milk proteins (peptides consisting of not more than five amino acids) are manufactured for this latter purpose.

Infant formulas containing less extensively hydrolysed cows' milk proteins have been proposed to help reduce the risk of developing cows' milk allergy, particularly for children thought to be at risk of the same (that is, children having at least one close family member who suffers from an allergy). Such products, are often described as hypoallergenic which term is defined in European Directive 96/4/EC in the context of milk as containing hydrolysed proteins the allergenicity of which is at least 100 times less than that of the unhydrolysed proteins. One process for the production of hypoallergenic cows' milk proteins is described in U.S. Pat. No. 5,039,532

Many other approaches have been proposed to reduce the allergenicity of cows' milk proteins but by comparison with this, relatively little attention has been paid to other dietary proteins which frequently provoke allergic reactions such as egg proteins. Eggs are an excellent source of high quality proteins which typically account for about 12% by weight of the edible part of the egg. Eggs may not only be consumed in their native state for example as boiled or poached eggs or omelettes for example but they are also frequently used as ingredients in other foodstuffs for both nutritional and functional purposes. For example, eggs may be used as colourants and binding agents in dishes such as pasta and as thickening and gelling agents in dishes such as puddings, quiches and sauces.

However, the egg protein ovalbumin in particular has been linked to the development of allergy. Indeed, reduction of allergenicity of egg proteins may be an even greater need then reduction of allergenicity of cows' milk proteins given that allergy to cows' milk proteins usually disappears spontaneously between the age of two and five years whereas allergy to egg proteins is generally slower to disappear and may even persist throughout life. It is therefore an object of the present invention to provide a process for producing hypoallergenic egg proteins as well as novel food products containing hydrolysed egg proteins.

SUMMARY OF THE INVENTION

Accordingly, the present invention provides a process for the production of enzymatically hydrolysed egg proteins comprising a first hydrolysis step in which intact egg proteins are subjected to enzymatic hydrolysis by a first protease, an intermediate heating step in which the product of the first hydrolysis is heated to a temperature not exceeding 75° C., a second hydrolysis step in which the product of the intermediate heating step is subjected to enzymatic hydrolysis by a second protease and an inactivation step in which the product of the second hydrolysis is heated to a temperature between 85 and 90° C. and maintained at this temperature for at least 30 minutes.

The present invention further extends to an egg pasta product comprising hydrolysed egg proteins. For example, the product may contain 50 to 85% flour, 5 to 15% hydrolysed whole egg and 10 to 40% water.

DETAILED DESCRIPTION OF THE INVENTION

Figure 1:
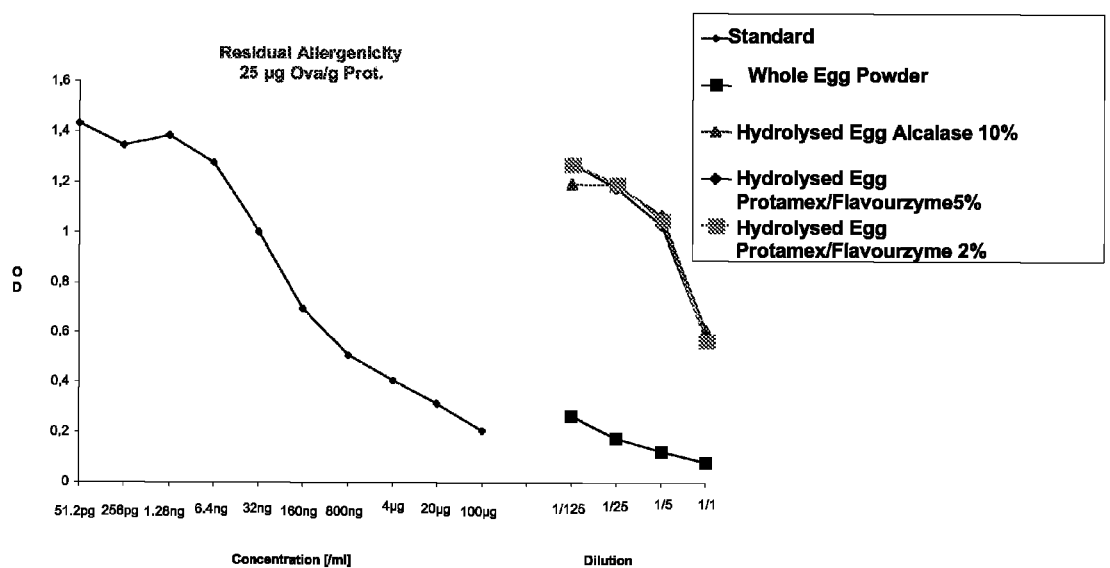
FIG. 1 shows the residual OVA-specific antigenicity of egg hydrolysates

In this specification, the following terms have the following meanings:—

"degree of hydrolysis" or "DH" of a protein means the amount of nitrogen in free $NH_2$ groups divided by the total amount of nitrogen (NH and $NH_2$ groups) expressed as a percentage;

"hydrolysed whole egg" means whole egg wherein the egg proteins have been partially hydrolysed;

"hypoallergenic hydrolysed whole egg" means hydrolysed whole egg wherein the hydrolysed egg proteins have an allergenicity which is at least 100 times less than that of unhydrolysed egg proteins "hlypoallergenic egg proteins" means hydrolysed egg proteins the allergenicity of which is at least 100 times less than that of unhydrolysed egg proteins.

All references to percentages are percentages by weight unless otherwise stated.

The first protease may be selected from the group comprising bacterial proteases from *Bacillus amyloliquefaciens* and *Bacillus licheniformis* and mixtures thereof, trypsin and pancreatin.

The second protease may be selected from the group comprising bacterial proteases from *Bacillus licheniformis*, fungal proteases from *Aspergillus oryzae*, trypsin and pancreatin.

An example of a bacterial protease from *Bacillus amyloliquefaciens* is the enzyme sold under the trade mark Neutrase°. The bacterial protease from *Bacillus licheniformis* is called subtilisin and an example of this enzyme is sold under the trade mark Alcalase®. An example of a mixture of bacterial proteases from *Bacillus amyloliquefaciens* and *Bacillus licheniformis* is the enzyme mixture sold under the trade mark Protamex®. An example of a fungal protease from *Aspergil-*

*lus oryzae* is the enzyme sold under the trade mark Flavourzyme®. As is well known to those skilled in the art, pancreatin is a mixture of trypsin and chymotrypsin which may be obtained from the porcine pancreas and trypsin itself may be obtained inter alia from pancreatin.

A particularly preferred combination of first and second protease are bacterial proteases from *Bacillus amyloliquefaciens* and *Bacillus licheniformis* as first protease and a fungal protease from *Aspergillus oryzae* as second protease. Alternatively, subtilisin may be used as both the first and second protease.

The starting material for the process of the invention is intact egg proteins in any convenient liquid form. An example of a suitable starting material is pasteurised whole liquid egg. The process of the invention may include an additional pre-heating step before the first hydrolysis step. The pre-heating may be carried out at a temperature not exceeding 65° C. for a period of from 2 to 15 minutes.

The temperature at which the first and second hydrolysis steps are carried out and the duration of those steps as well as the amounts of the first and second protease to be used will be selected by the man skilled in the art based upon the desired degree of hydrolysis of the end product and the properties of the selected proteases as is well known in the art. As a general rule, however, the greater the degree of hydrolysis required, the stronger the protease(s), the longer the duration of the hydrolysis and greater concentration of protease used. For example, to obtain a hydrolysate with a DH between 20 and 25%, one could use from 2 to 10% of enzyme (based on the weight of starting material to be hydrolysed) in each hydrolysis step and each hydrolysis step would last about two hours. Specific enzyme combinations might include the following (using the brand name of the exemplified enzymes of bacterial and fungal origin solely for the purpose of conciseness):—

| First Protease | Second Protease |
| --- | --- |
| Protamex 5% | Flavourzyme 5% |
| Protamex 2% | Flavourzyme 2% |
| Alcalase 10% | Alcalase 10% |
| Alcalase 5% | Alcalase 5% |
| Alcalase 5-10% | Protamex 5% |
| Alcalase 5-10% | Flavourzyme 5% |
| Neutrase 5-10% | Protamex 5% |
| Neutrase 5-10% | Flavourzyme 5% |
| Trypsin 1-5% | Protamex 5% |
| Trypsin 1-5% | Flavourzyme 5% |
| Pancreatin 1-5% | Protamex 5% |
| Pancreatin 1-5% | Flavourzyme 5% |

Likewise, the temperature at which the hydrolysis steps are carried out will be selected having regard to the proteases being used as the optimum temperature for enzymatic activity is enzyme specific. Adequate guidance in this matter will be given by the manufacturer of the enzyme.

Bitter taste may be a problem with some protein hydrolysates and the inventors have found that certain proteases and combinations of proteases give a particularly good result in this regard. It is for this reason that the combination of a bacterial protease from *Bacillus amyloliquefaciens* and *Bacillus licheniformis* as first protease and a fungal protease from *Aspergillus oryzae* as second protease is particularly preferred. It has further been found that using these two enzymes, a hydrolysate with a particularly good combination of organoleptic properties and reduced allergenicity can be produced by splitting the addition of the second protease such that between 10 and 60% of the second protease is added during the intermediate heating step with the remainder being added after completion of the intermediate heating step.

It is found that hydrolysed egg proteins produced by the process of the present invention have an allergenicity which is reduced by a factor of at least 100 compared to intact egg proteins as measured by the technique described by Fritsche et al (Int. Arch. Aller and Appl Imm., 93, 289-293, 1990). These hydrolysed egg proteins and hydrolysed whole egg containing them may thus be described as hypoallergenic.

The hypoallergenic hydrolysed whole egg produced according to the process of the invention is in the form of a homogeneous liquid. It may be used as such or may be dried in a manner known in the art such as roller drying, spray drying or freeze drying to produce a homogeneous powder which is shelf stable and can be stored until required. When the powder is reconstituted with water, it again forms a homogeneous liquid.

The hydrolysed whole egg may be used instead of whole egg in any food product in which whole egg is conventionally incorporated. For example, hydrolysed whole egg in powder or liquid form may be used in place of whole egg in recipes such as baked custards, quiches, crème caramel, cakes biscuits and puddings such as rice pudding. Alternatively, the hydrolysed whole egg may be used to prepare dishes such as omelettes and scrambled eggs after re-constitution with water if necessary. Hypoallergenic hydrolysed whole egg is a particularly suitable ingredient in foods for babies and small children, particularly those for use in the early stages of weaning. Again, the hydrolysed whole egg may be used in place of the whole egg conventionally used to prepare such products.

As noted above, allergies to dietary proteins are not confined to humans and hydrolysed egg produced by the process of the present invention may also be used in the manufacture of foodstuffs for animals, particularly companion animals such as dogs and cats. Hydrolysed egg may thus also be used to replace whole egg in foods intended for weaning puppies and kittens for example.

The invention further extends to an egg pasta product comprising hydrolysed egg proteins. For example the product may contain 50 to 85% flour, 5 to 15% hydrolysed whole egg and 10 to 40% water. Preferably the flour is durum wheat semolina flour. The hydrolysed whole egg may be produced by any suitable process including, but not limited to, the process described above.

The pasta product may be made by blending together the hydrolysed whole egg in the form of a powder with the water then mixing the flour with the egg and water and extruding the resultant mixture in the desired shape such as macaroni, tagliatelle, shells, spaghetti etc.

The extruded shapes may be blanched, coated with oil, quick-frozen, filled into suitable containers and stored in a freezer, for example at −25° C. until required. A typical composition of a frozen pasta according to the invention might be 56.5% durum wheat semolina, 6.2% hydrolysed whole egg, 34.6% water and 2.7% sunflower oil.

Alternatively, the extruded shapes may be blanched, coated with oil, filled into suitable containers and chilled, for example at 5 to 7° C. A typical composition of a chilled pasta according to the invention might be 53.7% durum wheat semolina, 8.9% hydrolysed whole egg, 34.8% water and 2.7% sunflower oil.

As a further alternative, the extruded shapes may be dried using techniques known in the art, filled into suitable containers and stored at ambient temperature until required. A typical composition of a dried pasta according to the invention might be 80.4% durum wheat semolina, 7.6% hydrolysed whole egg and 12.0% water and 2.75 sunflower oil.

The invention will now be further illustrated by reference to the following examples:—

Preparation of Egg Hydrolysates

The starting material was pasteurised liquid whole egg, FT/OVO/0105 R, ABCD S.A., Avicole Bretonne Cecab Distribution (Ploërmel, France).

Example 1

30 Kg of liquid whole egg was heated at 65° C. for 10 min with stirring at 250 rpm. After cooling to 55° C., 2% of Protamex® enzymes (batch PW2A1006, NOVOZYMES A/S Bagsvaerd, Denmark) was added and the mixture was maintained at 55° C. for 2 hours. After this first hydrolysis step, 1% of Flavourzyme® 1000 L enzymes (batch 400904, NOVOZYMES A/S Bagsvaerd, Denmark) was added and the mixture was heated at 75° C. for 10 min. The mixture was then cooled to 55° C., a further 1% of Flavourzyme enzymes was added and the mixture was maintained at 55° C. for 2 hours. After this second hydrolysis step, the mixture was heated at 90° C. for 30 min and then spray-dried to obtain a hydrolysed egg powder which was conditioned in an aluminium bag.

Example 2

35 Kg of liquid whole egg was heated at 65° C. for 10 min with stirring at 250 rpm. After cooling to 55° C., 5% of Protamex® enzymes (batch PW2A1006, NOVOZYMES A/S Bagsvaerd, Denmark) was added and the mixture was maintained at 55° C. for 2 hours. After this first hydrolysis step, 1% of Flavourzyme® 1000 L enzymes (batch 400904, NOVOZYMES A/S Bagsvaerd, Denmark) was added and the mixture was heated at 75° C. for 10 min. The mixture was then cooled to 55° C., a further 4% of Flavourzyme enzymes was added and the mixture was maintained at 55° C. for 2 hours. After this second hydrolysis step, the mixture was heated at 90° C. for 30 min and then spray-dried to obtain a hydrolysed egg powder which was conditioned in an aluminium bag.

Example 3

30 Kg of liquid whole egg was heated at 65° C. for 10 min with stirring at 250 rpm. After cooling to 55° C., 10% of Alcalase® 2.4 L enzymes (batch 500357, NOVOZYMES A/S Bagsvaerd, Denmark) was added and the mixture was maintained at 55° C. for 2 hours. After this first hydrolysis step, the mixture was heated at 75° C. for 10 min. The mixture was then cooled to 55° C., a further 10% of Alcalase enzymes was added and the mixture was maintained at 55° C. for 2 hours. After this second hydrolysis step, the mixture was heated at 90° C. for 30 min and then spray-dried to obtain a hydrolysed egg powder which was conditioned in an aluminium bag.

Total nitrogen in the hydrolysates was determined by the Dumas procedure (Carlo Erba method). Degree of hydrolysis was measured by the TNBS method according to Adler-Nissen (J. Agric. Food. Chem. 1979 27: 1256-1262). The hydrolysate of Example 1 was found to have a DH of 20%, the hydrolysate of Example 2 a DH of 23% and the hydrolysate of Example 3 a DH of 25%.

Products Containing Hydrolysed Whole Egg

Example 4

An example of the ingredients for a sweet egg pudding containing hydrolysed egg is as follows:—

| Ingredient | % |
| --- | --- |
| Whole milk (3.5% fat) | 62.0 |
| Water | 24.3 |
| Sugar | 5.5 |
| Hypoallergenic egg powder | 2.5 |
| Corn starch | 3.0 |
| Tapioca starch | 2.0 |
| Vanilla flavouring | 0.7 |

The pudding may be made by any suitable method known in the art.

Example 5

An example of the ingredients for a savory egg pudding containing hydrolysed egg is as follows:—

| Ingredient | % |
| --- | --- |
| Whole milk (3.5% fat) | 62.0 |
| Water | 21.5 |
| Frozen carrot cubes | 10.0 |
| Hypoallergenic egg powder | 1.5 |
| Corn starch | 3.0 |
| Tapioca starch | 2.0 |

The pudding may be made by any suitable method known in the art.

Example 6

An example of the ingredients for an egg pasta product containing hydrolysed egg is as follows:—

| Ingredient | % |
| --- | --- |
| Durum wheat semolina | 72 |
| Water | 22 |
| Hypoallergenic egg powder | 6 |

The pasta may be made by any suitable method known in the art.

Residual Antigenicity of Egg Hydrolysates

The residual antigenicity of the protein ovalbumin (OVA) in the hydrolysates of Examples 1, 2 and 3 was determined by ELISA inhibition with a polyclonal rabbit anti-OVA protein antiserum. Wells of microtitration plates were coated with 100 µl of OVA at 50 µg/ml in carbonate-bicarbonate buffer and incubated 24 hours at 4° C. Plates were washed 4 times in a PBS-Tween buffer and free reacting sites were blocked by adding 200 µl/well of fish gelatin (0.5% in PBS-Tween). Plates were incubated 1 hour at room temperature (RT) and washed again 4 times in PBS-Tween.

In separate tubes, 1 part of a standard OVA preparation or test sample are incubated for 1 hour at RT with 1 part of rabbit anti-OVA protein antibody (diluted 1:20'000). After incubation, 100 µl of this inhibition mixture is added to the above coated and blocked microtitration wells and incubated for 2 hours at room temperature. Plates were washed 4 times in PBS-Tween. A goat anti-rabbit peroxidase labelled conjugate (0.1 ml of a 1:2000 dilution) was then added, plates were incubated for 1 hour at room temperature and washed 4 times in PBS-Tween. The chromogenic substrate (0.1 ml O-phenylene-diamine) was added. After 15 minutes incubation, optical density was read at 492 nm on an ELISA plate reader.

The results are shown in FIG. 1 from which it may be seen that the OVA specific antigenicity of the hydrolysates from Examples 1 to 3 was reduced by a factor of over 10,000 compared to intact egg protein.

Residual Allergenicity of Egg Hydrolysates

A functional in vitro assay of tritiated serotonin release from sensitised rat mast cells was used to determine IgE dependent allergenicity of an antigenic molecule (OVA) as previously described (Fritsche et al. J. Allergy Clin. Immunol, Vol 100, No. 2, pages 266-273). Briefly, mast cells were obtained from normal Sprague-Dawley rats by peritoneal washes in Dulbecco's modified Eagle's medium containing 10% fetal calf serum. Cells were washed in this medium and kept overnight at 4° C. After two washes in phosphate-HEPES-fish gelatine buffer (PHG) pH 7.0, cells were re-suspended in the same buffer at $5 \times 10^5$ cells/ml and diluted with one volume of rat serum rich in IgE anti-OVA antibodies containing 5 µCi/ml 3H serotonin. After incubation at 37° C. for 2 hours, cells were further washed three times in PHG and re-suspended in PHG at $2.5 \times 10^5$ cells/ml. Sensitised mast cells were distributed in microtiter plates (0.1 ml/well) and mixed to 0.05 ml of serial dilutions of hydrolysed egg protein produced according to Example 2 (1/10 starting at 10 mg/ml). The mixture was incubated 60 minutes at 37° C. and centrifuged. An aliquot (0.05 ml) of the supernatant was mixed with 2 ml of scintillation fluid and $^3H$ release was measured using a Packard β-counter.

Figure 2:
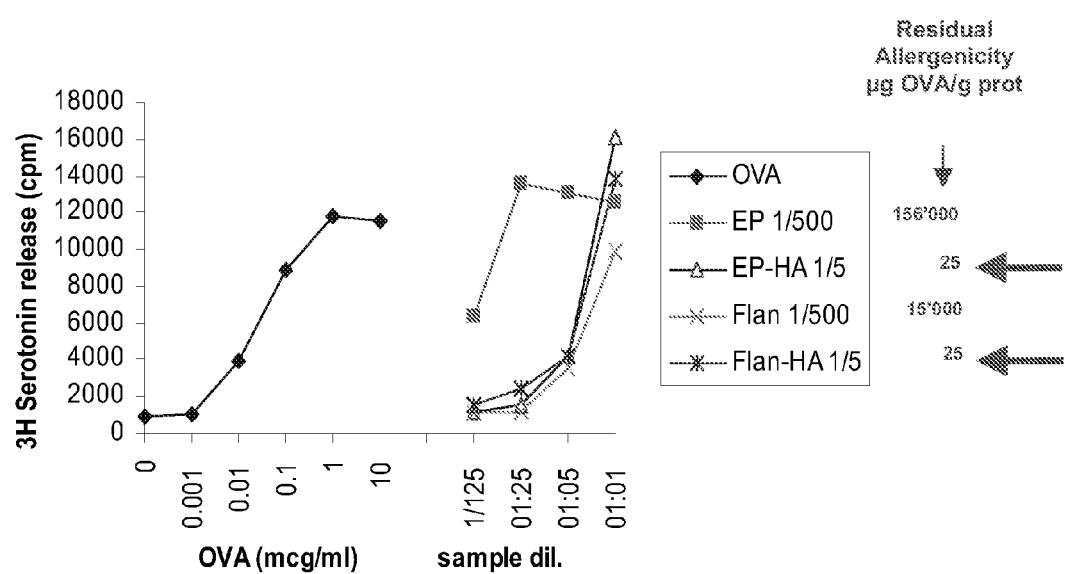
FIG. 2 shows the reduced allergenicity in a functional mast cell triggering assay

The results are shown in FIG. 2 from which it may be seen that the hydrolysed egg had a much reduced allergenicity (25 µg OVA/g protein equivalent) and that this low value was maintained when the hydrolysed egg was incorporated in a flan style dessert.

The invention claimed is:

1. A process for the production of enzymatically hydrolysed egg proteins, the process comprising
    enzymatically hydrolyzing intact egg proteins using a first protease in a first hydrolysis step to produce a hydrolyzed product, wherein the first protease is a mixture of bacterial proteases from *Bacillus amyloliquefaciens* and *Bacillus licheniformis*,
    heating the hydrolyzed product to a temperature not exceeding 75° C. in an intermediate heating step to produce a heated hydrolyzed product,
    enzymatically hydrolyzing the heated hydrolyzed product using a second protease comprising a fungal protease from *Aspergillus oryzae* in a second hydrolysis step to produce a final hydrolyzed product, wherein from 10 to 60% of the fungal protease from *Aspergillus oryzae* is added during the intermediate heating step and the remainder of the fungal protease from *Aspergillus oryzae* is added after completion of the intermediate heating step, and
    inactivating the final hydrolyzed product by heating the final hydrolyzed product to a temperature between 85 and 90° C. for at least 30 minutes.

2. The process of claim 1, comprising pre-heating the intact egg proteins at a temperature not exceeding 65° C. for a period of from 2 to 15 minutes before the first hydrolysis step.

* * * * *